July 17, 1934.    K. ZECHMANEK    1,966,747
SOUND PERMEABLE SCREEN AND THE PROCESS TO THE PRODUCTION THEREOF
Filed April 18, 1932

Patented July 17, 1934

1,966,747

UNITED STATES PATENT OFFICE 1,966,747

SOUND PERMEABLE SCREEN AND THE PROCESS TO THE PRODUCTION THEREOF

Karl Zechmanek, Vienna, Austria, assignor to Gustav Weigend, Vienna, Austria

Application April 18, 1932, Serial No. 605,988
In Austria April 22, 1931

9 Claims. (Cl. 88—24)

This invention relates to a sound permeable screen for cinemas and to a process for the production thereof. The object of this invention is advantageous as compared with the screens known heretofore not only as regards improved sound permeability but also offers much better optical qualities.

The process according to this invention consists in that onto a porous, fine fabric, preferably the raw fabric for the so called crêpe Georgette, a solution of wax, f. e. of paraffine, in a solving means, f. e. in gasoline, is sprayed by means of a painter's gun. After the rapid evaporation of the solving liquid an oil color (nitro cellulose lacquer, oil lacquer, pigment or the like) is sprayed onto the screen finely divided zinc oxide suspended in boiled linseed oil being the preferred material. The foregoing impregnation with paraffine or the like which may be dispensed with in the event of a fabric non-hygroscopic in itself is employed causes that the oil containing color is not distributed uniformly over the face of the screen but flows together to form small pearl like drops of circular, angular or striped form which fill part of the fabric pores while the rest of the same remains empty. The ratio of the filled and empty pores can be chosen within wide limits, but it seems that a medium ratio of 1 : 1 gives the best combination of optical and acoustical qualities. The step of applying a coating of wax or paraffin to the fabric is a preferred form which may be entirely omitted.

Figure 1:
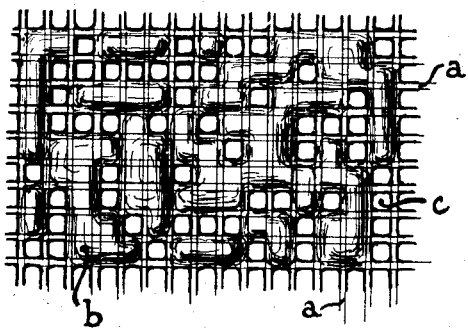
Figure 3:
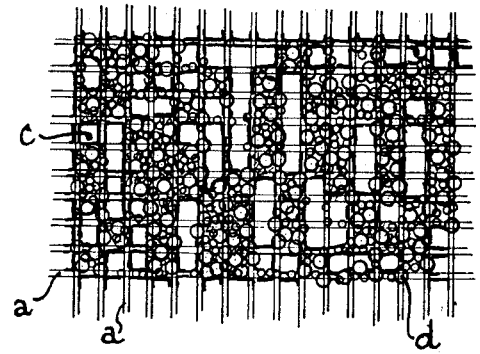
Figure 2:
Figure 4:
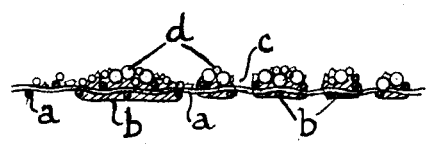

In the drawing there are two embodiments of the invention represented by way of example. Fig. 1 shows part of a screen according to this invention in elevation, Fig. 2 is a section therethrough taken at right angles with respect to Fig 1. Figs. 1 and 2 show the embodiment where the pearls are formed by drops of oil color. Figs. 3 and 4 correspond to Figs. 1 and 2, respectively and show an other embodiment, where glass pearls or the like are glued onto the surface of the oil color while the same is still wet.

$a$ are the threads of the fabric which consist of a not too hygroscopic material or are preferably impregnated with a wax solution in order to make the same perfectly anti-hygroscopic, $b$ are the pearls formed by the drops of oil color, $c$ are the pores which remain open for the pass of the sound, $d$ (in Figs. 3, 4) are small glass pearls or the like glued onto the surface of the larger oil pearls while the same have not yet dried.

A further improvement of the screen and of the process to the production thereof consists in that, while the color has not yet dried but is still sticky, light reflecting particles like small glass pearls, glass dust &c. are brought onto the screen by simply pouring the same onto the screen or by rolling the same or in any other suitable way. After a few say three hours when the color or lac has completely dried the excess of glass particles which do not firmly adhere to the screen is removed by brushing.

It is further advantageous to spray a nitro cellulose lacquer onto the first coating of glossy-white oil-color while the same is still tacky. By chemical reactions between these two coatings the first one becomes somewhat faded which is desirable in order to soften the glittering of the glass beads applied thereto without affecting the adhesive force of such bead on the lacquer.

The elevated pearls of the oil containing color or the glass particles, respectively, cause a very good plasticity of the pictures since the shadows are well reproduced on the lateral vaults of the pearls while the lights are well reproduced especially on the summits thereof. Especially with glass particles the efficiency of light is increased several times over that obtained heretofore and moreover the clearness and plasticity of the pictures are further improved. A further advantage of the screen according to this invention consists in that the pictures do not look so distorted when seen from the side as on the known screens. Also this advantage is due to the pearls.

A further improvement of the screen and of the process to the production thereof consists in that the fabric is colored with red color, for example an aniline color, prior to the spraying on with the paraffine solution and the oil containing color. The red color of the fabric shines through a pure, white color of the oil paint and causes a timbre which is very agreeable for the eyes and has been never attained heretofore.— A colored glass can also be employed.

The process described produces a screen which due to the oil containing color offers the further advantage of unlimited durability and which can be used on both sides. Such a screen can be easily cleansed by means of soap and water. Any choking of the pores by dust and consequent reducing of the sound permeability is thereby prevented as well as any diminishing of the optical efficiency.

I wish to be understood that I do not limit myself to the embodiments of my said invention as described by way of example but that I am desirous to obtain protection by Letters Patent in the full scope of the annexed claims.

What I claim is:

1. A sound permeable screen for cinemas comprising a fine porous fabric, an impregnation or coating of paraffine applied to the said fabric and a coating of pearl shaped droplets of a pigment suspended in oil applied to the said impregnated fabric and to pores thereof substantially uniformly distributed over the said fabric producing closed and open pores.

2. A sound permeable screen for the purpose described comprising a fine porous fabric, an impregnation or coating of paraffine applied to the said fabric, a coating of pearl shaped droplets of a pigment suspended in oil applied to the said impregnated fabric and to pores thereof substantially uniformly distributed over the said fabric producing closed and open pores and light reflecting particles applied to the said color coating.

3. A sound permeable screen for the purpose described comprising a fine porous red dyed fabric, an impregnation or coating of paraffine applied to the said fabric, a coating of pearl shaped droplets of a pigment suspended in oil applied to the said impregnated fabric and to pores thereof substantially uniformly distributed over the said fabric producing closed and open pores.

4. A process for the production of a sound permeable screen for the purpose described comprising the steps of first impregnating a fine porous fabric with a solution of a paraffine-like wax in a gasoline-like solving medium, of spraying a pigment suspended in oil onto the said impregnated fabric to such an extent only to have pores substantially uniformly distributed over the said fabric thereof closed by pearls of a pigment suspended in oil and to leave the rest open.

5. A process for the production of a sound permeable screen for the purpose described comprising the steps of first dyeing a fine porous fabric with a red color, then impregnating or coating the threads thereof with a solution of a paraffine-like wax in a gasoline-like solving medium, of spraying an oil-color onto the said impregnated or coated fabric to such an extent only to have pores substantially uniformly distributed over the said fabric closed by pearls of oil-color and to leave the rest open.

6. A process for the production of sound permeable screens for the purpose described comprising the steps of first impregnating or coating a fine porous fabric with a solution of a paraffine-like wax in a gasoline-like solving medium, of spraying an oil-color onto the said impregnated or coated fabric to such an extent only to have pores substantially uniformly distributed over the said fabric closed by pearls of oil-color and to leave the rest open, of applying light reflecting particles onto the still sticky oil-color and of removing the excess thereof by brushing after the drying of the oil-color.

7. A process for the production of sound permeable screens for the purpose described comprising the steps of first impregnating a fine porous fabric with a solution of a paraffine-like wax in a gasoline-like solving medium, of spraying an oil-color onto the said impregnated fabric to such an extent only to have pores thereof substantially uniformly distributed thereover closed by pearls of oil-color and to leave the rest open, to spray a nitro cellulose lacquer onto the said oil-color coating while being still tacky, of applying light reflecting particles onto the still sticky lacquer and of removing the excess thereof by brushing after the drying of the lacquer.

8. A process for the production of sound permeable screens for the purpose described comprising the steps of spraying an oil-color onto a fine, porous non-hygroscopic fabric to such an extent only as to close pores substantially uniformly distributed over the said fabric by pearls of oil-color and to leave the rest of the pores open.

9. A sound permeable screen for cinemas comprising a fine porous fabric, a coating of pearl shaped droplets of an oil-color applied to the said fabric threads and to pores thereof producing closed and open pores distributed substantially uniformly over the said fabric.

KARL ZECHMANEK.